US008645843B2

(12) United States Patent
Chee et al.

(10) Patent No.: US 8,645,843 B2
(45) Date of Patent: Feb. 4, 2014

(54) SUPPORTING ROLE-BASED ACCESS CONTROL IN COMPONENT-BASED SOFTWARE SYSTEMS

(75) Inventors: Yi-Min Chee, Yorktown Heights, NY (US); Ru Fang, Beijing (CN); Feng Liu, Beijing (CN); Qian Ma, Beijing (CN); Daniel V. Oppenheim, Croton on Hudson, NY (US); Krishna Ratakonda, Yorktown Heights, NY (US); Zhi Le Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 12/201,060

(22) Filed: Aug. 29, 2008

(65) Prior Publication Data

US 2010/0058197 A1  Mar. 4, 2010

(51) Int. Cl.
*G06F 3/00* (2006.01)
(52) U.S. Cl.
USPC ............. 715/751; 715/753; 726/8; 726/14; 713/165; 709/206
(58) Field of Classification Search
USPC .......... 715/751; 726/2–15; 709/223; 713/165
See application file for complete search history.

(56) References Cited

U.S. PATENT DOCUMENTS

| 5,339,403 | A   |   | 8/1994  | Parker |
|-----------|-----|---|---------|--------|
| 6,014,666 | A   |   | 1/2000  | Helland et al. |
| 6,658,427 | B2  | * | 12/2003 | Kogut-O'Connell et al. ........ 1/1 |
| 6,959,268 | B1  | * | 10/2005 | Myers, Jr. et al. ................ 703/6 |
| 7,171,448 | B1  | * | 1/2007  | Danielsen et al. ............ 709/205 |
| 7,216,125 | B2  |   | 5/2007  | Goodwin |
| 7,222,369 | B2  |   | 5/2007  | Vering et al. |
| 7,627,617 | B2  | * | 12/2009 | Kavuri et al. .......................... 1/1 |
| 7,747,719 | B1  | * | 6/2010  | Horvitz et al. ................ 709/223 |
| 7,904,875 | B2  | * | 3/2011  | Hegyi ............................ 717/103 |
| 7,979,463 | B2  | * | 7/2011  | Durbin .......................... 707/781 |
| 7,992,189 | B2  | * | 8/2011  | Griffin et al. ...................... 726/1 |
| 8,103,591 | B2  | * | 1/2012  | Bouchet .......................... 705/59 |
| 8,406,421 | B2  | * | 3/2013  | Kamen et al. .................. 380/28 |

(Continued)

OTHER PUBLICATIONS

William Tolone, Access controls in collaborative systems, Mar. 2005, ACM Digital, vol. 37, pp. 29-41.*

*Primary Examiner* — Nathan Flynn
*Assistant Examiner* — Viral Lakhia
(74) *Attorney, Agent, or Firm* — Scully, Scott, Murphy & Presser, P.C.; Daniel P. Morris, Esq.

(57) ABSTRACT

A method, system and computer program product is disclosed for supporting role-based access control in a collaborative environment, wherein pluralities of users work together in a collaborative process using a software system. The method comprises componentizing the software system into a multitude of software components, and limiting access to specific software components to certain users based on roles assigned to the users as defined by a run-time state of the collaborative process. The set of components that a user can access is dynamic, that set can change based on the "context" or the step where the user is in a collaborative workflow/process. Thus, in comparison with traditional access control mechanisms, an embodiment of the invention combines three different elements: a) the set of components that comprise the application is partitioned in such a way as to make componentized role-based access control feasible, b) a method for specifying inter-component dependencies to enable role-based groups, and c) enabling the modification of the access privileges based on contextual information from a collaborative process.

19 Claims, 5 Drawing Sheets

(56) References Cited

U.S. PATENT DOCUMENTS

| | | |
|---|---|---|
| 2002/0083059 A1* | 6/2002 | Hoffman et al. .................. 707/9 |
| 2003/0229623 A1 | 12/2003 | Chang et al. |
| 2006/0047657 A1* | 3/2006 | Frieder et al. .................... 707/9 |
| 2006/0089932 A1* | 4/2006 | Buehler et al. .................... 707/9 |
| 2007/0113187 A1* | 5/2007 | McMullen et al. ........... 715/742 |
| 2007/0115940 A1* | 5/2007 | Kamen et al. .................. 370/352 |
| 2008/0028180 A1* | 1/2008 | Newman et al. ............... 711/206 |
| 2008/0086758 A1* | 4/2008 | Chowdhury et al. .............. 726/2 |
| 2008/0201453 A1* | 8/2008 | Assenmacher ............... 709/219 |
| 2009/0007223 A1* | 1/2009 | Centonze et al. .................. 726/1 |
| 2009/0019522 A1* | 1/2009 | Cudich et al. ..................... 726/3 |
| 2009/0099895 A1* | 4/2009 | Carrier et al. ..................... 705/9 |

\* cited by examiner

| ROLE | ROLE 2 | |
|---|---|---|
| VALID FROM | 08/07/07 | VALID UNIT 08/07/08 |
| VERSION | 1.0 | |
| COMPONENTS | Component a, Component b, Component c, Component d, Component e, Component f | |
| DEPENDENCY | Component a -> Component b, Component c -> Component e, Component d -> Component e, Component e -> Component f | |
| CHANGE CONDITIONS | If Activity A.status == Running<br>{ Activate (Component a, Component b) }<br><br>If Activity B.status == Running<br>{ Deactivate (Component a, Component b)<br>Activate (Component c, Component d, Component e, Component f) } | |

SUPPORTING ROLE-BASED ACCESS CONTROL IN COMPONENT-BASED SOFTWARE SYSTEMS

BACKGROUND OF THE INVENTION

1. Field of the Invention

This invention generally relates to access control in software systems, and more specifically, to role-based access control in component based software systems.

2. Background Art

With the booming of Internet and world economy, people now are in a world where information is shared more equally and freely. This has produced a strong impact over the way people work and communicate. Lots of businesses today are actually carried out and delivered by different collaboration units (CU). For example, according to a recent report, 30 percent of traditional professional IT service jobs will be delivered by people who come from emerging markets, i.e. from different countries all over the world. Therefore, providing effective and appropriate software systems to support today's businesses within a collaborative context is a key issue to the software industry.

Typically, a software system supporting collaborative work might be used by people in different roles. These people not only have their own responsibilities on business, but also utilize the software system to collaborate with each other. In other words, people in different roles often work through a collaborative process to fulfill the business requirements. However, it is not very difficult to find that the person in each role usually has different considerations and only needs to care about the related functions for his own work. From the management view, this also implies a requirement on the management team to do process control and guarantee security by letting the software system provide only the necessary functions to the person in a corresponding role.

Furthermore, the function set of a specific role in a collaborative environment is often dynamically changeable. The software systems should provide related functions to the role according to the run time system environment of the collaborative process. Finally, given the complexity of today's software system and the high cost of software development, it may be impossible to offer a separate version of the software system for each role. Therefore, a method to support role-based access control in the software systems under a collaborative context becomes very important and necessary.

On the other hand, today's software systems are more inclined to be developed using modular components which can be seen as a new programming paradigm beyond the object oriented programming. In other words, a software system is constructed based on the assembly of some well-defined components at run-time. For example, the Eclipse plug-in architecture is a well known representative of the component-based architecture. This kind of modularization achieved through componentization, helps customize the functions in a software system among the users in different roles.

There are some existing solutions that address access control in a distributed system.

U.S. Pat. No. 5,339,403 discloses a procedure including a Privilege Attribute Certificate (PAC) that represents the users' access rights. When the user wants to access an application, it passes the PAC to the application, and to a PAC User Monitor (PUM) to validate the PAC to determine whether the user is authorized to access the application. Although this disclosure offers the apparatus to support user authorization in a distributed system, it does not target the role-based access control issue which is typically more complex than this basic idea.

Role-based access control is going to differentiate the access right of certain roles to the software systems. U.S. Pat. No. 7,222,369 describes a role-based portal to a workplace system, which attempts to provide corresponding data, materials and tools when different roles login the workplace. A role-based filter component is proposed in this reference to use data from an assigned role data file for determining whether the specific tools and information should be accessed by a particular individual. However, this reference does not describe a method for handling dynamic changes to the role-based access mechanism.

U.S. Pat. No. 6,014,666 discusses considers another important problem in role-based access control. When the user ids and groups in the operating system are used by the application software to do the access control, it is difficult for the application software to decide whether the related user ids and groups already exist in the target operating system. Thus, the reference provides an automatic mapping mechanism to let the application software define the logical user ids and groups and then transform the logical user ids and groups into real user ids and groups when the application software is deployed.

Resource organization in role-based access control is investigated in U.S. Patent Publication 2003/0229623 A1. This reference describes the hierarchical relationships among the enterprise resources and assigns each role a set of such resources. Forward and reverse inheritance is applied to each user level-role assignment such that each user is allowed all permissions for ancestors to the assigned level or descendants to the assigned level.

U.S. Pat. No. 7,216,125 studies the resource query and selection problem in role-based access control. This reference provides an automated technique to efficiently generate a list of resources to which a user can apply an action when the user passes the authorization step.

However, the above references do not address the problem of tackling access control in the context of a component-based software system with dynamic roles that may change as defined by a run-time context in a process involving multiple parties.

SUMMARY OF THE INVENTION

Embodiments of the invention provide a method, system and computer program product for supporting role-based access control in a collaborative environment, wherein a plurality of users work together in a collaborative process using a software system. The method comprises componentizing the software system into a multitude of software components; and limiting access to specific software components to certain users based on roles assigned to the users as defined by a run-time state of the collaborative process.

The set of components that a user can access is dynamic, that set can change based on the "context" or the step where the user is in a collaborative workflow/process. Thus, in comparison with traditional access control mechanisms, an embodiment of the invention combines three different elements: a) the set of components that comprise the application is partitioned in such a way as to make componentized role-based access control feasible, b) a method for specifying inter-component dependencies to enable role-based groups, and c) enabling the modification of the access privileges based on contextual information from a collaborative process.

Under a collaborative environment, people playing different roles cooperate with each other according to a predefined work process for business. They often install the same kind of software system but just use parts of its functions which relate to their own work. In the component-based software, this kind of function set can be located into a set of components, and hence the function controlling to this software can be seen as the access restriction on the corresponding components to certain roles. Furthermore, the components that a role can access are intrinsic-changed during runtime, since the work which this role should take currently is according to the running step of the collaborative process. In an embodiment of this invention, a model is used for the software system to capture the configurations of its components, the different roles, the collaborative process, and the relationships among them. Based on this model, a profile of component set is provided to each role. This profile not only records what components a specific role can access, but also describes how to change the authorized component set based on the running status of the collaborative process. During runtime, the software system only loads components according to the corresponding role's profile which deactivates other components. Although different roles use the same kind of software system, the usable function set is different among them. This kind of function set is also very easy to be managed through editing each role's profile.

Embodiments of the invention provide a unified approach to address the following problems collectively: defining the set of components and the dependencies between them in the context of a specific role in order to divide the software system; providing a mechanism to manage the corresponding components for different roles and update the set of components when necessary; and supporting a dynamically changing component set according to the run-time context of a collaborative process.

DETAILED DESCRIPTION OF THE PREFERRED EMBODIMENTS

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
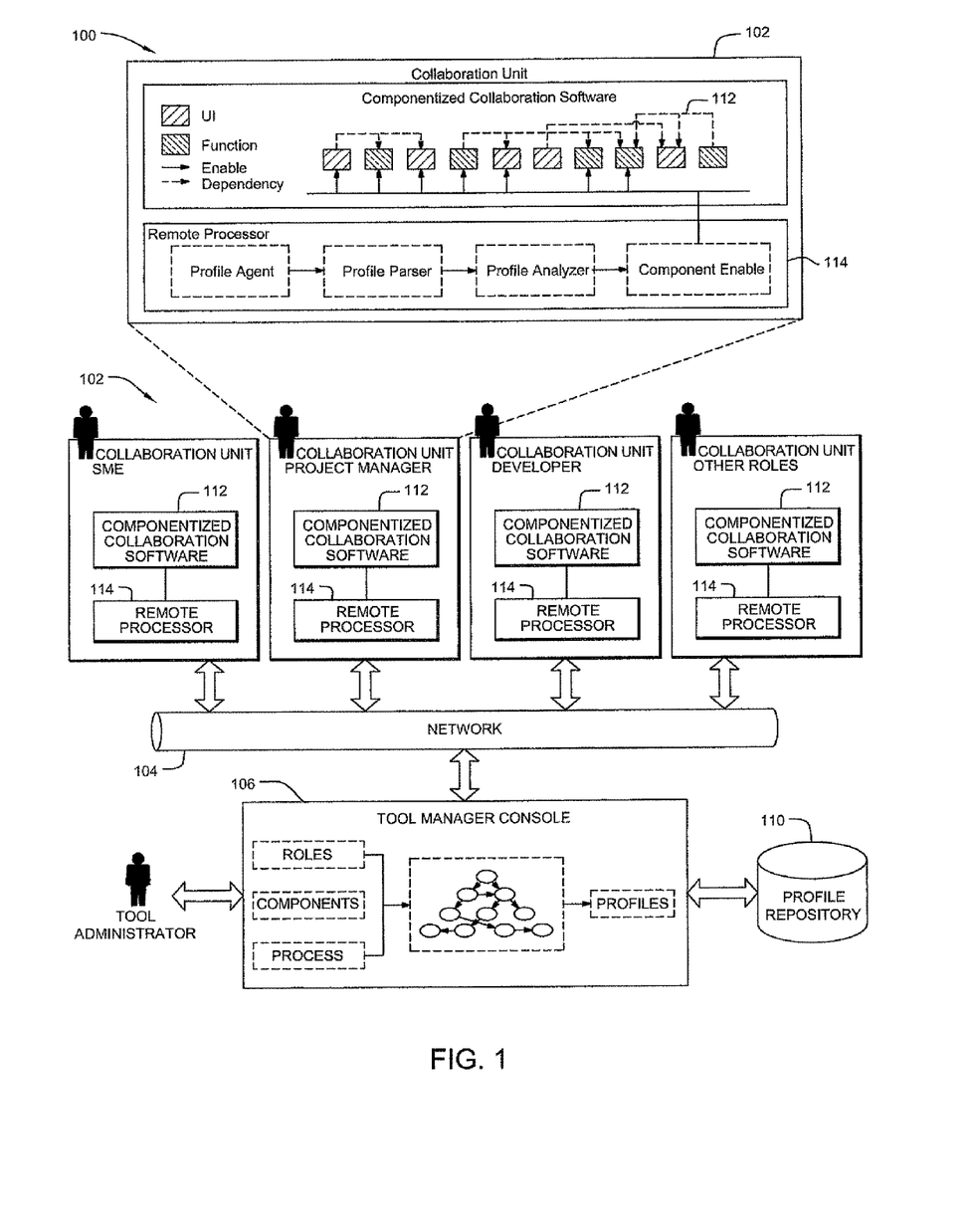
FIG. 1 illustrates the high level architecture of a system embodying this invention.
Figure 2:
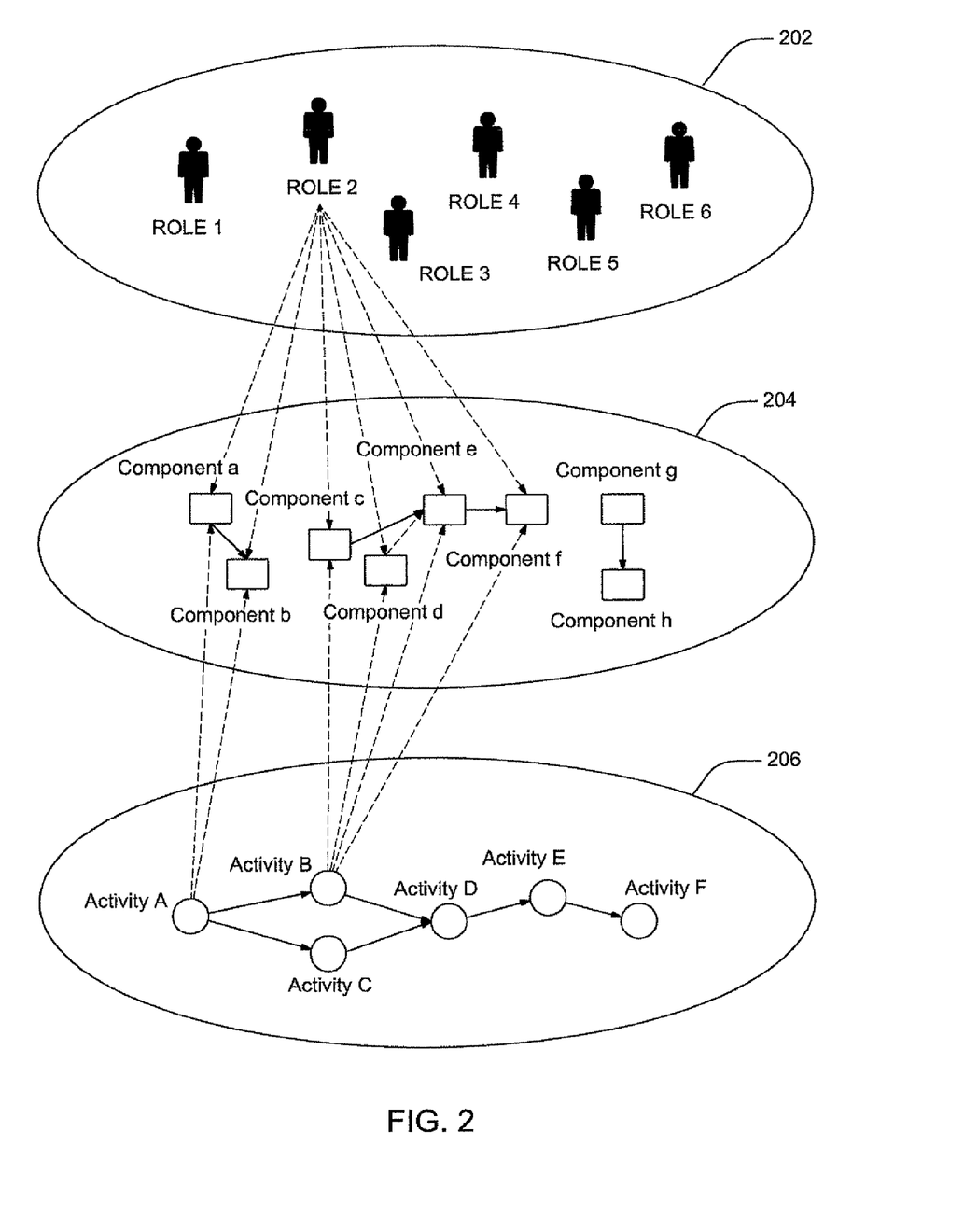
FIG. 2 depicts an overview of a centralized model used in the architecture of FIG. 1.

With reference to FIGS. 1 and 2, embodiments of the invention provide role-based access control in component based software systems in a collaborative environment. FIG. 1 illustrates a high level architecture 100 of an embodiment of the invention. FIG. 1 shows a group of Collaboration Units (CUs) 102 connected by a network 104. A Tool Manager Console 106 and a Profile Repository 110 are also shown. Each collaboration Unit includes a componentized Collaboration Software 112 and a remote processor 114.

Each role in the environment has a set of corresponding components while accessing the functions outside the component set is restricted. A disclosed method uses a centralized model to describe the components of a software system, the different roles, the collaborative process and the relationships among them. Based on the model, provided is a profile for each specific role to capture related information of the component set of the role. These profiles construct a division to the software system. Through the management of these profiles, the selective loading of the component set can be implemented.

An important aspect of the invention is a centralized model that captures the components of the software system, the different roles using the system, the collaborative process and the relationship among them. This model would give a holistic view of the component-based software system. FIG. 2 depicts the overview of the centralized model. FIG. 2 also shows a series of roles at 202, a set of components at 204, and a group of activities at 206.

To more details, there are three kinds of relationships needed to be described in this model. The first one is the dependency among the components. One component can not operate properly when it lacks of the components on which it depends. So this kind of dependency is needed for providing a complete component set for a specific role. For example, some algorithms, like depth-first search can be used to generate this complete set based on the dependency among components.

The second relationship is the component ownership of a role. This relationship represents what components are needed to be loaded when one role runs the software system. In particular, this ownership is recorded into a profile for each role. In other words, this profile describes all components belonging to one role. All the profiles may be saved in a repository 110, and they achieve the different division of the software system. For example, the ownership between the roles and the components in FIG. 2 describes that Role 2 has the access right of Component a, b, c, d, e and f The third kind of relationship is the components needed to be accessed for accomplishing a specific activity in the collaborative process. This relationship is leveraged to propose another significant feature of an embodiment of the invention, i.e., to support the dynamical changed component set of a specific role during runtime. In fact, different roles usually comply with a predefined process to cooperate with each other in a collaborative environment, which means that they will work according to an order. Therefore, the software system should not only know what components belong to a specific role, but also know which part of these components should be activated when the collaborative process attains a specific step. In other words, the components that a role can access will be automatically changed according to different step in the process. A disclosed method uses this component ownership of a specific activity to define the change of access privilege for a role. For instance, in FIG. 2, the Component a and b can be accessed in Activity A, while the access right in Activity B is changed to Component c, d, e and f. Therefore, the actual components that a role can access during runtime are the intersection between its own components and the components under current running activity.

Figure 3:
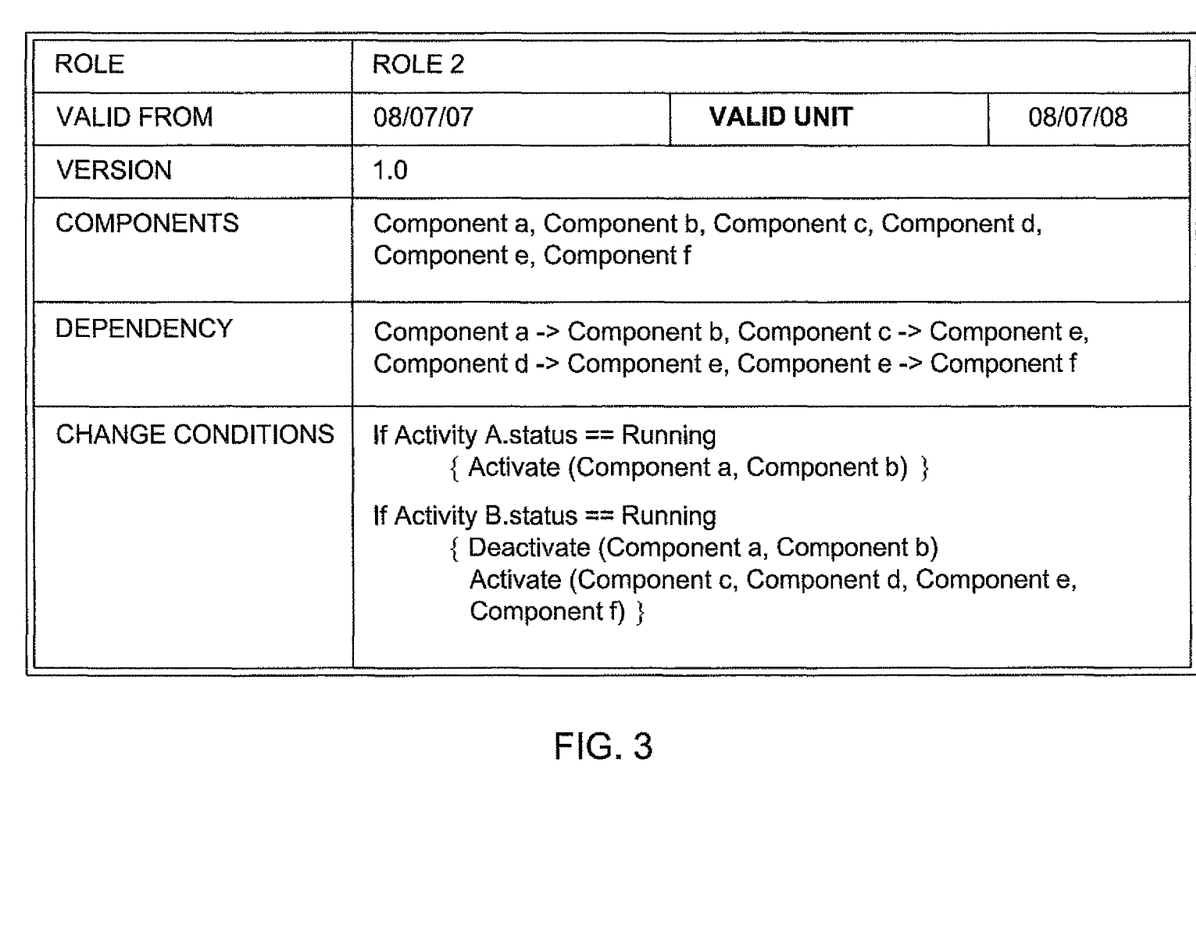
FIG. 3 shows a sample profile for a role in an embodiment of the invention.

A sample profile for one role in an embodiment of this invention can be implemented as shown in FIG. 3.

From the administrator's point of view, he can use the "Tool Manager Console" to control the accessible functions for each role by managing their profiles. The administrator can provide or reclaim the functions to a specific role by adding or removing components from the role's profile. The "Tool Manager Console" can also offer some synchronization mechanism to ensure consistency between the console and the remote site. When a remote CU receives a profile, that CU will analyze the profile to decide and load the corresponding component set. In another embodiment, if the centralized model is described as an object-oriented model, some existing languages such as the Object Constraint Language (OCL) can be used to define the change conditions as declarative constraints. The remote processor may validate the constraints during runtime to decide what components can be activated.

Taking a real example to further explain the above method in an embodiment of the invention, there are many roles in a typical collaborating software development tool, such as domain expert called "Subject Master Expert (SME)", the project manager, the developer and etc. The general work process is that, firstly, SMEs document their best practice as some kinds of templates according to their expertise and previous experience. Thus, the SME has three functions: "create/configure template", "publish template" and "check template compliance". Secondly, the project manger would leverage these templates to define the actual development process for a real project, so he also has three functions: "browse existing templates", "create/configure process" and "publish process". After the project manager successfully configures the development process, the developers are involved to develop corresponding modules. The developer has the function "develop module". Finally, the whole process would enter testing, delivering, maintaining and other things.

Therefore, when we consider a specific project development, the functions "create/configure template" and "publish template" are firstly enabled during the template design activity. After publishing the template, the enabled function is changed into "check template compliance" since no further modification is allowed. In contrary, the project manager only can "browse existing templates" in the template design phase, while "create/configure process" and "publish process" can be used after the template is published. The developer will start to work under the condition that the process is published. Therefore, this embodiment of the invention guarantees the work process through different roles.

Figure 4:
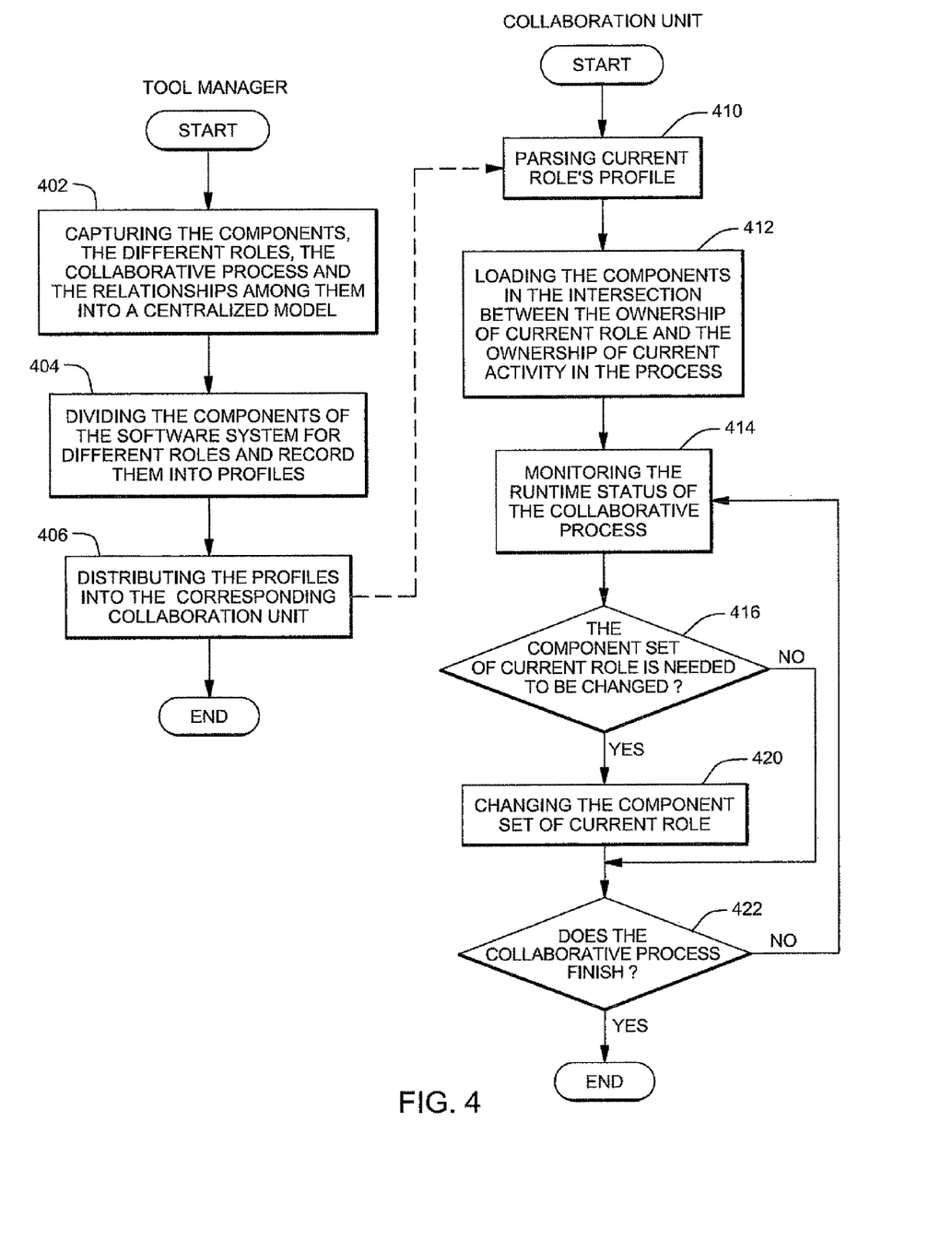
FIG. 4 illustrates the workflow of an embodiment of this invention.

FIG. 4 shows the workflow of an embodiment of a method of the invention. This workflow illustrates steps performed by the Tool Manager and steps performed by the Collaboration Units. At step 402, the Tool Manager captures the components, the different roles, the collaborative process and the relationships among them, into a centralized model. At step 404, the Tool Manager divides the components of the software system for different roles and records them into profiles. At step 406, the Tool Manager distributes the profiles into the corresponding Collaboration Unit. This completes the operation of the Tool Manager.

The Collaboration Unit, at step 410, parses the current role's profile, and at step 412, loads the components in the intersection between the ownership of the current role and the ownership of the current activity in the process. At step 414, the Collaboration Unit monitors the runtime status of the collaborative process; and at step 416, the Collaboration Unit determines if the component set of the current role needs to be changed. If it does need to be changed, this is done at step 420. At step 422, the CU determines if the collaboration process is finished. If it is, the process ends, while if the collaboration process is not finished, the process returns to step 414 and continues on from there.

Embodiments of the invention provide important advantages, including modular design of a role-based access control mechanism, combined access control and componentization of the software system, and incorporating the collaborative process into the role-based access control.

Modular Design of a Role-Based Access Control Mechanism

Based on the centralized model, the complete set of necessary components for a specific role is recorded into his profile. The software system can merely load these components for supporting this role's usage. Therefore, the person's behavior has been controlled by tailoring his component set in the software system to prevent him from executing non-authorized functions.

Combined Access Control and Componentization of the Software System

The componentization of a software system distributes its functions into more finely granular components, so that tying access control to this kind of software design attains more flexible restriction. It would eliminate mistakes during access control at ran-time in comparison with systems where role-based access control is implemented as a separate module from the functional application. At the same time, the access privilege of each role is also very easy to be managed and updated in the componentization of the software system by controlling the lifecycle of each role's component profile.

Incorporating the Collaborative Process into the Role-Based Access Control

In fact, different roles usually comply with a specific process in the cooperative context. In other words, their work steps are organized as some predefined order. The software system not only classifies which components belong to a particular role but also activate appropriate components according to currently running step in the collaborative process. This invention provides a mechanism to support a dynamic component set through defining the change conditions based on the model and analyzing them before activating the corresponding components. The mechanism guarantees the work process among these roles.

Figure 5:
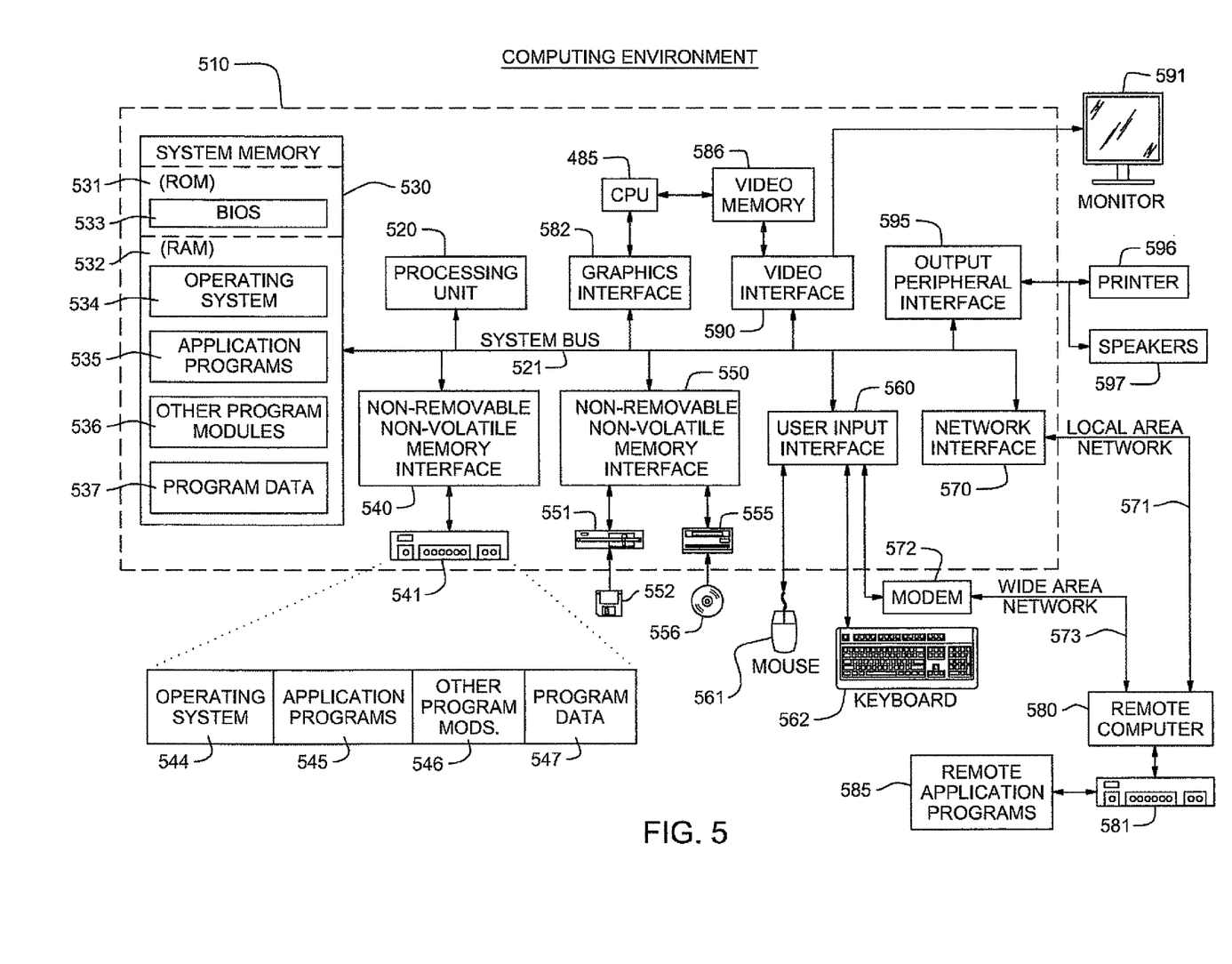
FIG. 5 shows a computing environment that may be used to implement this invention.

For example, FIG. 5 and the following discussion provide a brief general description of a suitable computing environment in which the invention may be implemented. It should be understood, however, that handheld, portable, and other computing devices of all kinds are contemplated for use in connection with the present invention. While a general-purpose computer is described below, this is but one example, the present invention may be implemented in an environment of networked hosted services in which very little or minimal client resources are implicated, e.g., a networked environment in which the client device serves merely as a browser or interface to the World Wide Web.

Although not required, the invention can be implemented via an application-programming interface (API), for use by a developer, and/or included within the network browsing software, which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations.

Other well known computing systems, environments, and/or configurations that may be suitable for use with the invention include, but are not limited to, personal computers (PCs), server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 5, thus, illustrates an example of a suitable computing system environment 500 in which the invention may be implemented, although as made clear above, the computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500. With reference to FIG. 5, an exemplary system for implementing the invention includes a general purpose-computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531 RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrate a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating System 544, application programs 545, other program modules 546, and program data 547 are given different numbers here to illustrate that, at a minimum, they are different copies.

A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB).

A monitor 591 or other type of display device is also connected to the system bus 521 via an interface, such as a video interface 590. A graphics interface 582, such as Northbridge, may also be connected to the system bus 521. Northbridge is a chipset that communicates with the CPU, or host-processing unit 520, and assumes responsibility for accelerated graphics port (AGP) communications. One or more graphics processing units (GPUs) 584 may communicate with graphics interface 582. In this regard, GPUs 584 generally include on-chip memory storage, such as register storage and GPUs 584 communicate with a video memory 586. GPUs 584, however, are but one example of a coprocessor and, thus, a variety of co-processing devices may be included in computer 510. A monitor 591 or other type of display device is also connected to the system bus 521 via an interface, such as a video interface 590, which may in turn communicate with video memory 586. In addition to monitor 591, computers may also include other peripheral output devices such as speakers 297 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 281 has been illustrated in FIG. 5. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 2 illustrates remote application programs 585 as residing on memory device 581. It will be appreciated that the network connections shown are exemplary and other means of establishing a communications link between the computers may be used.

One of ordinary skill in the art can appreciate that a computer 510 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

While it is apparent that the invention herein disclosed is well calculated to fulfill the objects discussed above, it will be appreciated that numerous modifications and embodiments may be devised by those skilled n the art, and it is intended that the appended claims cover all such modifications and embodiments as fall within the true scope of the present invention.

What is claimed is:

1. A method of supporting role-based access control in a collaborative environment, wherein a plurality of users work together in a collaborative process including a multitude of activities using a software system, the method comprising:
   componentizing the software system into a multitude of software components;
   assigning an associated set of the multitude of software components to each of a plurality of roles in the collaborative process;
   assigning to each of the users one of said plurality of roles as a current role of the user, as defined by a run-time state of the collaborative process;
   activating a set of the multitude of software components to perform one of said activities as a current activity in the collaborative process;
   limiting access of the users to the software components by providing each of the users with access to only the software components that are common in both the set of the software components assigned to the current role assigned to said each user, and the set of the software components activated to perform the current activity.

2. The method according to claim 1, wherein during the collaborative process, the users have a plurality of different roles, and the componentizing the software system includes
   capturing the different roles and the collaborative process into a centralized model; and
   using said centralized model to divide the software system into role specific components sets and assigning the sets of components into role profiles.

3. The method according to claim 2, wherein the roles login to the collaborative process, and the limiting access to specific components includes:
   when one of the roles logins to the collaborative process, loading corresponding software components on the profile for the roles in the software system; and
   changing the components that certain roles can access according to the run-time context determined by the collaborative process.

4. The method according to claim 3, further comprising providing a user interface to enable an administrator to manage and update the profiles.

5. The method according to claim 4, wherein the capturing the different roles and the collaborative process into a centralized model includes describing the relationships among the components, the different roles, and the collaborative process in the centralized model, including the dependencies between components, the ownership between the roles and the components, and the ownership between activities in the collaborative process and the components.

6. The method according to claim 5, wherein the using said centralized model to divide the software system into role specific components sets includes:
   analyzing the relationships in the centralized model to generate different role profiles; and
   parsing the role profiles to load the components in the intersection between the ownership of the current role and the ownership of the current activity in the collaborative process.

7. The method according to claim 6, wherein the using said centralized model to divide the software system into role specific components sets further includes monitoring a current runtime status of the collaborative process to dynamically change the accessible components for different roles.

8. The method according to claim 1, wherein the limiting access of the users to the software components includes:
   developing a profile for each of the roles listing the software components assigned to said each role.

9. The method according to claim 8, wherein each profile identifies conditions for changing the set of the software components assigned to said each role based on the running states of the collaborative process.

10. The method according to claim 1, further comprising;
    using a computer system implementing a collaborative process program to perform the assigning an associated set of the multitude of software components to each of the roles, assigning to each of the users one of said roles, and limiting access of the users to the software components.

11. An access control system for supporting role-based access control in a collaborative environment, wherein a plurality of users work together in a collaborative process including a multitude of activities using a software system, the access control system comprising one or more processor units configured for:
    componentizing the software system into a multitude of software components;
    assigning an associated set of the multitude of software components to each of a plurality of roles in the collaborative process;
    assigning to each of the users one of said plurality of roles as a current role of the user, as defined by a run-time state of the collaborative process;
    activating a set of the multitude of software components to perform said one of said activities as a current activity in the collaborative process;
    limiting access of the users to the software components by providing each of the users with access to only the software components that are common in both the set of the software components assigned to the current role assigned to said each user, and the set of the software components activated to perform the current activity.

12. The access control system according to claim 11, wherein during the collaborative process, the users have a plurality of different roles, and the componentizing the software system includes:
    capturing the different roles and the collaborative process into a centralized model; and
    using said centralized model to divide the software system into role specific components sets and assigning the sets of components into role profiles.

13. The access control system according to claim 12, wherein the roles login to the collaborative process, and the limiting access to specific components includes:
    when one of the roles logins to the collaborative process, loading corresponding software components on the profile for the roles in the software system; and
    changing the components that certain roles can access according to the run-time context determined by the collaborative process.

14. The access control system according to claim 13, wherein the capturing the different roles and the collaborative process into a centralized model includes describing the relationships among the components, the different roles, and the collaborative process in the centralized model, including the dependencies between components, the ownership between the roles and the components, and the ownership between activities in the collaborative process and the components.

15. An article of manufacture comprising:
at least one tangible computer usable device having computer readable program code logic tangibly embodied therein to execute a machine instruction in one or more processing units for supporting role-based access control in a collaborative environment, wherein a plurality of users work together in a collaborative process including a multitude of activities using a software system, the computer readable program code logic, when executing, performing the following:
componentizing the software system into a multitude of software components;
assigning an associated set of the multitude of software components to each of a plurality of roles in the collaborative process;
assigning to each of the users one of said plurality of roles as a current role of the user, as defined by a run-time state of the collaborative process;
activating a set of the multitude of software components to perform said one of said activities as a current activity in the collaborative process;
limiting access of the users to the software components by providing each of the with access to only the software components that are common in both the set of the software components assigned to current role assigned to said each user, and the set of the software components activated to perform the current activity.

16. The article of manufacture according to claim 15, wherein during the collaborative process, the users have a plurality of different roles, and the componentizing the software system includes:

capturing the different roles and the collaborative process into a centralized model; and
using said centralized model to divide the software system into role specific components sets and assigning the sets of components into role profiles.

17. The article of manufacture according to claim 15, wherein the capturing the different roles and the collaborative process into a centralized model includes describing the relationships among the components, the different roles, and the collaborative process in the centralized model, including the dependencies between components, the ownership between the roles and the components, and the ownership between activities in the collaborative process and the components.

18. The article of manufacture according to claim 17, wherein the using said centralized model to divide the software system into role specific components sets includes:
analyzing the relationships in the centralized model to generate different role profiles; and
parsing the role profiles to load the components in the intersection between the ownership of a current role and the ownership of a current activity in the collaborative process.

19. The article of manufacture according to claim 18, wherein the limiting access of the users to the software components includes:
developing a profile for each of the roles listing the software components assigned to said each role.

* * * * *